Nov. 9, 1954   C. G. LUTTS ET AL   2,693,673
CHAIN LINK AND A NONKINK CHAIN MADE FROM A PLURALITY THEREOF
Filed March 4, 1950

INVENTORS
CARLTON G. LUTTS
ALBERT M. LEAHY
by Wright, Brown, Quinby & May
ATTYS

United States Patent Office 2,693,673
Patented Nov. 9, 1954

---

2,693,673

CHAIN LINK AND A NONKINK CHAIN MADE FROM A PLURALITY THEREOF

Carlton G. Lutts, Salem, and Albert M. Leahy, Somerville, Mass.

Application March 4, 1950, Serial No. 147,696

4 Claims. (Cl. 59—84)

This invention relates to chain cables such as are used for mooring ships, and more particularly to cables composed of links of the type known as "Die Lock," such links being described and illustrated in Patent No. 1,974,827, granted to Lutts et al. September 25, 1934. References made herein to "Die Lock" chain links will mean the chain link described in that patent.

It has been found that in cases of failure of chain cable in actual use, kinking of the cable is in many instances a contributing cause of the failure. The weakening action of kinking has been demonstrated by tests to reduce the effective strength of the chain cable to about 40% of its rated breaking strength. An object of the present invention is to improve the "Die Lock" chain link to obviate the formation of kinks in chain cables composed of such links.

In the case of the kinked chain, the engaging ends of the two twisted links no longer bear in a straight line, but bear at a point half way up the side of the adjacent paired link. This out-of-line connection tends to bend the links and seriously reduces their strength. With "Die Lock" construction, this concentrated transverse pressure against the lock in the side of the link tends to bend the link and make it fail at this point.

According to the present invention, the tendency of anchor chain to kink can be practically done away with by adopting a tapered contour in the link arranged to induce slippage in the links. The link is thickened at the middle and gradually reduced in thickness to the stock diameter at its two ends. A thickening at the middle point to 1.25 times the rod stock diameter of the link has been found very effective. Greater degrees of thickening would undoubtedly be effective also, but it can be pointed out that the vertical pockets in the wildcat of the windlass in which the chain must run usually have a width of 1.50 times the rod stock diameter of the chain. The link cannot therefore equal this ratio of thickness as it would not enter the slot. Actually a substantial clearance is required for free operation. A thickened link of the indicated ratio gives enough down hill slope to permit links to slide out of a kink without bending or otherwise damaging the link.

For convenience in describing relative dimensions, the following description of improved chain links will be given in terms of links made of rod stock having a diameter of one inch, but it is evident that similar proportions can be had in chain links of larger as well as smaller sizes.

The change of shape in the "Die Lock" type of chain link resulting from an increase of 25% in its thickness at its transverse median not only provides sloping surfaces on both faces of the link which promote a sliding action between the contacting points thereof with the adjoining links, but also makes possible an important increase of strength by employment of suitable materials and processes in making the link. Thus, although the weight of the improved link is increased only about 10% by the additional thickness, an increase of approximately 50% in its proof strength and an increase of about 35% in its rated breaking strength is obtainable.

As explained in the said patent, No. 1,974,827, the standard "Die Lock" link is made by forging together two separately formed parts, each of these parts having been previously forged from a piece of rolled bar stock bent to a U shape. In order to obtain the greatest feasible strength, it is customary to employ an alloy type of steel. For example, alloy steel NE8627 can be employed, the normal tensile strength of a one inch rod of such steel being approximately 100,000 pounds per square inch. The symbol NE8627 designates a steel alloy containing .5% nickel, .5% chromium, .25% molybdenum and .27% carbon, according to the system of notation adopted by the American Iron and Steel Institute and now in general use in this country, the stated percentages being subject to specified ranges of variation from the figures given. Similarly, the symbol NE8615 designates a similar steel alloy except that the carbon content is .15% or within the range of tolerated variation from that figure. High carbon steel of this kind can be heat treated to a tensile strength of 150,000 pounds per square inch without unduly diminishing its toughness. This can be done by heating the steel to approximately 1550° and quenching, then drawing the steel at a temperature of about 850°. In order to take advantage of the maximum tensile strength of such steel, the male member of the standard "Die Lock" link is preferably heat treated as described after being forged to shape, such shape including tapered ends having a series of alternate necks and collars of successively smaller cross sections. The female member of the link is forged at a temperature of 2100° or so to its desired shape including end sockets to receive the tapered ends of the male member. It is then heated to about 2200°, assembled with a male member and forged thereto, the completed link being allowed to cool slowly. The female member of the link described in the aforesaid patent is not subjected to a heat treatment to increase its tensile strength because it is desirable that the link, if tested to destruction, break at a quarter rather than at the lock. The weakest point of the joints of the standard "Die Lock" link is the largest neck of the male member which has a cross sectional area of about 65% to 70% of that of the rod stock, but since the neck is of heat-treated steel and is subjected to straight tension when a load is put on the link, failure occurs at the female quarters which are not heat treated and are subjected to shearing stresses.

In the new improved "Die Lock" link, as a result of increasing the thickness of the midportion of the link in order to obtain a non-kink shape, the necks of the male member of the link are increased in cross-sectional area by approximately 17%. Since, as in the standard link, the male member is heat treated, this increased neck gives the lock of the link an unnecessarily large margin of strength over the female quarters. Hence, the strength of the female member can be considerably increased without approaching too close to the breaking strength of the locks, this strengthening of the female member resulting in an equal increase in the strength of the link as a whole. Such strengthening can be obtained by suitable heat treatment. The treatment, however, should be such as to leave the female member weaker than the locks since it is desirable that if failure occurs, such failure take place at the female quarter. It is also undesirable to use high carbon steel for quenching from forging temperatures since such quenching is apt to injure the steel. Hence, according to the present invention, the female member is made of steel having a lower carbon content which gives better resistance to quenching from forging temperatures and a somewhat lower hardenability. For example, the female member may be made of NE8615 steel. This steel can safely be quenched from forging temperatures without impairment of quality. Furthermore, in order to insure adequate toughness of the female member and also uniformity of strength in the links, the entire shot of chain of which the link is a part is drawn at a temperature of 850° or so after the female members have been successively forged to the male members and quenched. The strength in the female metal is always less than that of the male members owing to the relatively low carbon content of the steel in the female member.

A feature of particular importance in the improved link is the substantial increase in the proof strength of the improved link as compared with the standard "Die Lock" link of the same rated size, such increase being approximately 50%, the increase in weight being only about 10%. The proof strength of a chain cable is of practical importance because it is the guaranteed strength of the cable when it is sold. The proof strength of any size and type of chain cable is a somewhat arbitrary figure which is arrived at by experience and trial and is related to the elastic properties of the chain as well as to its actual tensile strength. When a chain cable is prepared for the market, it must be tested to see that there are no latent defects which would cause the chain to fail under loads which it should be able to take. It is obviously impossible to test every chain to the point of destruction of one or more links. Hence the customary requirement is to impose on each shot of chain (fifteen fathoms) a predetermined load which is considerably in excess of the ordinary loads which the chain will be expected to bear in actual service but not sufficient to damage the chain so as to make it inoperative on the wildcat. The proof load for any size and type of chain is adopted at a figure which will not unduly stretch the chain beyond its elastic limit. The elastic limit of the chain depends on the material of which the links are made. The permissible permanent elongation of a shot of steel chain in a proof test is usually from 15 to 18 inches. The proof test is of practical importance because it is the measure of the test load to which every shot of chain has been actually subjected before being sold. A chain cable composed of improved links made as herein described can be given a comparatively high proof rating because the heat treatment of both members composing each link raises the elastic limit more rapidly than the ultimate breaking strength. Thus, one inch standard "Die Lock" chain is given a proof rating of 75,000 pounds. The improved "Die Lock" link made in accordance with the present invention is given a proof rating of 116,000 pounds, this being an increase of approximately 55%. The rated breaking strength of the standard "Die Lock" link 116,000 pounds, (equal to the proof strength of the new link), this figure being somewhat under the experimental figures obtained through actual tests. In like manner the rated breaking strength of the new link is 157,000 pounds, this being an increase of 35%.

The improved "Die Lock" link is illustrated on the drawing, of which—

Figure 1:
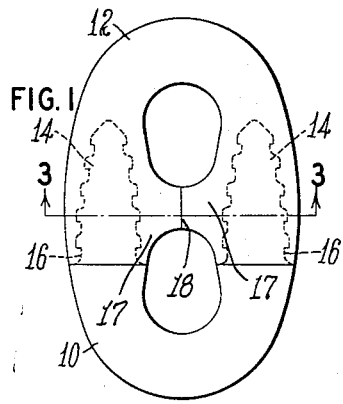
Figure 1 is a side elevation.
Figure 2:
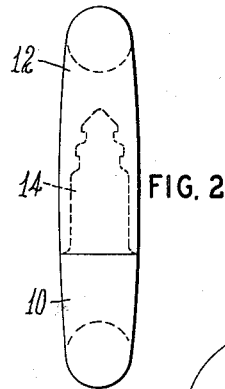
Figure 2 is an edge view.
Figure 3:
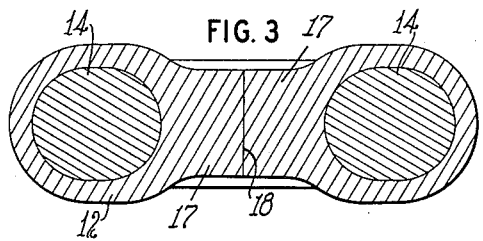
Figure 3 is a sectional view on the line 3—3 of Figure 1.
Figure 4:
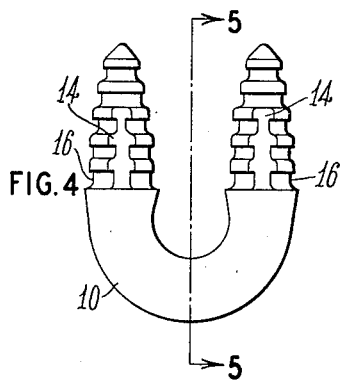
Figure 4 is a side elevation of the male member of the link shown in Figure 1.
Figure 5:
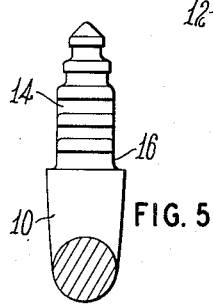
Figure 5 is a section on the line 5—5 of Figure 4.

The side view of the link shown in Figure 1 is substantially identical with that of the standard "Die Lock" link illustrated in Patent No. 1,974,827; but the thickness of the improved link, as indicated in Figure 2, shows a maximum at the transverse median plane, which is approximately 25% greater than the thickness at the ends, the latter being equal to the diameter of the bar stock of which the link is made. The link is composed of two members 10 and 12, each of which is separately forged from a piece of rolled bar stock which has been bent to U shape as described in the aforesaid patent. When the hollows are forged in the ends of the female member 12 to receive the tapered end portions which extend from the ends of the legs of male member 10, a portion of the metal of the stock is displaced inwardly to form lugs 17 which abut as at 18 to form a transverse stud for the finished link. The male member 10, illustrated in Figures 4 and 5, has tapered end portions 14 consisting of alternating series of necks and collars which successively decrease in cross sectional area toward the extremities, these tapered end portions 14 being received and secured within the hollows in the ends of the leg portions of the female member 12, all as fully illustrated and described in the aforesaid patent. The largest neck 16 is necessarily of less cross sectional area than the bar stock and has been shown by calculation and experimentation to be the weakest point of the lock since it is not supported against tensional stress by any of the metal of the female member.

Figure 6:
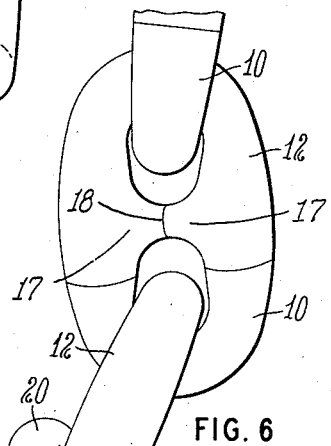
Figure 6 is an elevational of a series of chain links showing the relative position of a pair of successive links when kinked.

The chain link shown on the drawing is of generally oval form having an opening adjacent each end thereof, which openings are separated by a transverse stud consisting of the inwardly projecting and abutting lugs 17 located approximately midway of the length of the link, said oval link being of standard proportions except that it is thicker at its midportion than the diameter of the bar stock. The surfaces of the link taper uniformly from said midportion of greatest thickness to opposite ends of the link, said tapering surfaces being of true frusto-conical configuration throughout from said midportion to said opposite ends, which frusto-conical configuration is interrupted only at the opposite inner surfaces of the link adjacent the midportion thereof by portions of the inwardly-extending and abutting lugs 17 which lugs form the transverse stud. To define this construction in another way, it may be said that the top, bottom and outer, opposite side surfaces of the link, as viewed in Figure 1 of the accompanying drawing, are of true frusto-conical configuration from the midportion of the link to the opposite ends thereof, while the inner side surfaces of the link which define the opposite sides of the openings at opposite ends of the link taper uniformly in true frusto-conical configuration from opposite sides of the transverse stud toward opposite ends of the link. The thickness of the link at the ends or bases thereof is stock thickness, whereas the maximum thickness at the midportion is preferably of the order of 1.25 times stock thickness. If, for example, the link is made of one inch stock, the overall length of the link is six inches, its width is 3.6 inches and the thickness at the ends is one inch. In the improved link shown on the drawing, the maximum thickness is 1.25 inches. The frusto-conical configuration of positions of the link as above described, i. e. the uniform tapering of the thickness of the link from the transverse median of greatest thickness toward both ends having the configuration above described is sufficient to promote slipping of the mutually contacting points of kinked links so as to get under the kink. As shown in Figure 6, when a pair of links are kinked and a load is placed upon the cable, a bow 20 of each link bears against a lock portion 22 of the other link and the tension on the cable tends to result in a bending stress on both links. The frusto-conical surfaces of the links resulting from the uniform tapering from the midportion of greatest thickness to the opposite ends of the link promote a sliding movement between the links to the normal position in which the bow 20 of one link engages in the bow 20 of the other link.

The largest neck 16 of the male member 10 in a one inch link of the improved kind has a cross sectional area of .56 square inch as compared with an area of .48 square inch in the standard type of "Die Lock" link described in the said patent. The male member 10 is preferably of a steel having a relatively high hardenability, for example, NE8627. This member, after being forged and air cooled, is heated to a temperature of about 1550° and quenched, and is thereafter drawn at approximately 850°. The female member is made of a steel having a lower hardenability, for example, NE8615. These specific examples of material are subject to variation, provided that the carbon content or hardenability of the steel in the male member is substantially greater than that of the steel in the female member. The female member is forged to shape at a temperature of about 2100°, is reheated to a temperature of about 2200° and is then forged on to a male member to complete the link. The link is then immediately quenched to harden the female member. This member, being of low carbon steel, is not injured by quenching from the forging temperature. After the shot of chain has been completed, it is drawn for a sufficient period of time at a temperature of 850°. This tempers the female and also the male member if the latter has not already been tempered, but the former being of lower carbon steel is hardened to a lesser degree and is therefore not as strong as the male member. The chain is then ready for prooftesting at a load equal to the rated breaking load of standard "Die Lock" chain of the same size. Furthermore, if any portion of the chain is tested to destruction, the failure will occur at the female quarters rather than at the lock.

We claim:

1. A chain link comprising a pair of complementary members of rolled steel stock, each of said members being of U-shape and having a base portion and substantially parallel legs secured together with the legs of the two members disposed, respectively, in confronting axial alignment, a stud extending transversely across the midportion of said link between the opposite inner surfaces thereof, said complementary members and said stud forming a chain link of generally oval form having an opening adjacent each end thereof with the openings separated by said stud, said link being of greatest thickness at the midportion thereof and of stock thickness at the opposite ends thereof, the surfaces of the link tapering uniformly from said midportion of greatest thickness to stock thickness at the ends thereof, said tapering surfaces being of frusto-conical configuration throughout from said midportion to said ends which frusto-conical configuration is interrupted only at the opposite inner surfaces of the link adjacent the midportion thereof by portions of said transverse stud, one of said complementary members being composed of stock of higher carbon content than the other whereby the strength of said one member exceeds the strength of the other, said one member having ribbed tip portions of reduced cross-sectional area projecting axially endwise from its legs and permanently secured in axial extending sockets provided in the legs of the other member, the other member having extensile strength greater than the shear strength of its base portion, and the higher carbon content of said one member providing a shear strength in its base portion greater than the shear strength of the base portion of said other member, and the said frusto-conical configuration of the surfaces of both members and the cross-sectional area of the projecting tip portions on the legs of said one member providing in conjunction with the higher carbon content of said one member a tensile strength in the area of the midportion of the link greater than the shear strength of the base portion of said other member so that said base portion of the other member is the weakest portion of the link.

2. A chain link as defined in claim 1 wherein the greatest thickness of the link at the midportion thereof is approximately 1.25 times the stock thickness at the opposite ends of said link.

3. A non-kink link chain comprising a plurality of substantially identical chain links interlinked to form a length of chains, each link comprising a pair of complementary members of rolled steel stock, each of said members being of U-shape and having a base portion and substantially parallel legs secured together with the legs of the two members disposed, respectively, in confronting axial alignment, a stud extending transversely across the midportion of said link between the opposite inner surface thereof, said complementary members and said stud forming a chain link of generally oval form having an opening adjacent each end thereof with the openings separated by said stud, said link being of greatest thickness at the midportion thereof and of stock thickness at the opposite ends thereof, the surfaces of each link tapering uniformly from said midportion of greatest thickness to stock thickness at the ends thereof, said tapering surfaces being of frusto-conical configuration throughout from said midportion to said ends which frusto-conical configuration is interrupted only at the opposite inner surfaces of the link adjacent the midportion thereof by portions of said transverse stud, one of said complementary members being composed of stock of higher carbon content than the other whereby the strength of said one member exceeds the strength of the other, said one member having ribbed portions of reduced cross-sectional area projecting axially endwise from its legs and permanently secured in axially-extending sockets provided in the legs of the other member, the other member having a tensile strength greater than the shear strength of its base portion, and the higher carbon content of said one member providing a shear strength in its base portion greater than the shear strength of the base portion of said other member, said frusto-conical configuration of the surfaces of both members and the cross-sectional area of the projecting tip portions of the legs of said one member providing in conjunction with the higher carbon content of said one member a tensile strength in the area of the midportion of the link greater than the shear strength of the base portion of said other member so that said base portion of the other member is the weakest portion of the link, and the said frusto-conical configuration of the surfaces of the plurality of interlinked links cooperating with the corresponding surfaces of adjacent links in the chain when the chain is kinked to effect unkinking of the links of the chain.

4. A non-kink link chain as defined in claim 3 wherein the greatest thickness of each of the links constituting the chain is at the midportion of each link, and wherein said midportion of greatest thickness is approximately 1.25 times the stock thickness at the opposite ends of each link.

References Cited in the file of this patent

UNITED STATES PATENTS

| Number | Name | Date |
|---|---|---|
| 1,919,347 | Sunderland | July 25, 1933 |
| 1,974,827 | Lutts et al. | Sept. 25, 1934 |
| 2,147,343 | Hokanson | Feb. 14, 1939 |
| 2,387,606 | Parker | Oct. 23, 1945 |

FOREIGN PATENTS

| Number | Country | Date |
|---|---|---|
| 316,681 | Germany | Nov. 26, 1918 |